(12) United States Patent
Sima et al.

(10) Patent No.: US 12,450,753 B2
(45) Date of Patent: Oct. 21, 2025

(54) METHODS AND SYSTEMS FOR DUAL CHANNEL TRANSFER OF GAME

(71) Applicant: Pixelworks Semiconductor Technology (Shanghai) Co. Ltd, Shanghai (CN)

(72) Inventors: Miao Sima, Shanghai (CN); Chaohui Lin, Shanghai (CN); Baochen Liu, Shanghai (CN); Zongming Han, Shanghai (CN); Gongxian Liu, Shanghai (CN); Yu Zhao, Shanghai (CN)

(73) Assignee: PIXELWORKS SEMICONDUCTOR TECHNOLOGY (SHANGHAI) CO. LTD., Shanghai (CN)

( * ) Notice: Subject to any disclaimer, the term of this patent is extended or adjusted under 35 U.S.C. 154(b) by 764 days.

(21) Appl. No.: 17/652,272

(22) Filed: Feb. 23, 2022

(65) Prior Publication Data

US 2023/0245326 A1 Aug. 3, 2023

(30) Foreign Application Priority Data

Jan. 30, 2022 (CN) .......................... 202210113599.4

(51) Int. Cl.
    *G06K 9/00* (2022.01)
    *G06T 3/10* (2024.01)
    *G06T 7/223* (2017.01)
    *H04N 19/176* (2014.01)
    *H04N 19/517* (2014.01)

(52) U.S. Cl.
CPC ................ *G06T 7/223* (2017.01); *G06T 3/10* (2024.01); *H04N 19/176* (2014.11); *H04N 19/517* (2014.11)

(58) Field of Classification Search
CPC ... G06T 15/005; G06T 15/04; G06T 2200/08; G06T 9/004; G06T 7/223; G06T 7/215; G06T 7/41; G06T 7/40; G06T 7/579
See application file for complete search history.

(56) References Cited

U.S. PATENT DOCUMENTS

| | | | |
|---|---|---|---|
| 8,358,379 B1 | 1/2013 | Woodall | |
| 9,094,561 B1 * | 7/2015 | Cheng | H04N 19/61 |
| 9,106,926 B1 * | 8/2015 | Li | H04N 19/553 |
| 9,357,161 B1 * | 5/2016 | Cheng | H04N 5/145 |
| 9,736,456 B1 * | 8/2017 | Chen | H04N 13/264 |
| 2004/0218626 A1 * | 11/2004 | Tyldesley | H04N 21/631 |
| | | | 370/464 |

(Continued)

OTHER PUBLICATIONS

"Pixel Perfection®: Bringing TV features and quality to projection systems across all market segments," Pixelworks Website, Available Online at https://www.pixelworks.com/en, Available as Early as May 17, 2019, 4 pages.

*Primary Examiner* — Avinash Yentrapati
(74) *Attorney, Agent, or Firm* — McCoy Russell LLP

(57) ABSTRACT

Various methods are provided for generating motion vectors in the context of 3D computer-generated images. An example method includes generating, based on a current frame to be rendered, a block-level motion vector with depth (MVD) texture comprising a set of block-level motion vectors each having an associated depth value, outputting the block-level MVD texture for image processing on a first channel, and outputting at least a portion of the current frame on a second channel.

17 Claims, 10 Drawing Sheets

(56) References Cited

U.S. PATENT DOCUMENTS

| | | | | |
|---|---|---|---|---|
| 2011/0096832 A1* | 4/2011 | Zhang | ............... | H04N 13/261 |
| | | | | 382/162 |
| 2011/0222602 A1* | 9/2011 | Sung | ............... | H04N 19/597 |
| | | | | 375/E7.243 |
| 2011/0249188 A1* | 10/2011 | Cheng | ............... | H04N 19/56 |
| | | | | 348/E5.062 |
| 2012/0236934 A1* | 9/2012 | Chen | ............... | H04N 19/597 |
| | | | | 375/E7.076 |
| 2013/0038686 A1* | 2/2013 | Chen | ............... | H04N 19/176 |
| | | | | 348/E13.001 |
| 2013/0044183 A1* | 2/2013 | Jeon | ............... | H04N 19/103 |
| | | | | 375/240.03 |
| 2018/0352138 A1* | 12/2018 | Takanashi | ............ | G03B 17/565 |
| 2020/0322625 A1* | 10/2020 | Abe | ............... | H04N 19/537 |
| 2021/0067798 A1* | 3/2021 | Chujoh | ............ | H04N 19/56 |
| 2022/0101504 A1* | 3/2022 | Cheng | ............... | G06T 3/40 |
| 2023/0274489 A1* | 8/2023 | Zhang | ............... | G06T 15/00 |

* cited by examiner

METHODS AND SYSTEMS FOR DUAL CHANNEL TRANSFER OF GAME

CROSS REFERENCE TO RELATED APPLICATIONS

The present application claims priority to Chinese Patent Application No. 202210113599.4, entitled "METHODS AND SYSTEMS FOR DUAL CHANNEL TRANSFER OF GAME," and filed on Jan. 30, 2022. The entire contents of the above-listed application is hereby incorporated by reference for all purposes.

FIELD

Embodiments of the subject matter disclosed herein relate to the field of three-dimensional (3D) computer graphics, and in particular how to improve the rendering of interpolated frames within a 3D environment.

BACKGROUND

Over the years, an increase in computer processing power has enabled real-time video rendering, for example for video games or certain animations, to become increasingly sophisticated. For example, whereas early video games featured pixelated sprites moving on a fixed background, contemporary video games feature photorealistic three-dimensional scenes filled with characters. Meanwhile, the miniaturization of processing components has enabled mobile devices, such as handheld video game devices and smartphones, to effectively support real-time rendering of high-frame rate, high-resolution video.

3D graphical video may be output in a variety of different framerates and screen resolutions. It may be desired to convert video with 3D graphics from one framerate (and/or resolution) to another framerate (and/or resolution). In order to save computational power while still increasing the framerate, interpolated frames can be used instead of rendering all frames within a video. Interpolated frames can be effectively generated through the use of motion vectors (also referred to herein as MVs), which track the difference in position of objects between the current frame (CF) and previous frame (PF).

BRIEF DESCRIPTION

Embodiments are disclosed herein for the calculation and transmission of motion vectors in the context of 3D computer graphics. In one example, a method includes generating, based on a current frame to be rendered, a block-level motion vector with depth (MVD) texture comprising a set of block-level motion vectors each having an associated depth value, outputting the block-level MVD texture for image processing on a first channel, and outputting at least a portion of the current frame on a second channel.

DETAILED DESCRIPTION

Figure 1:
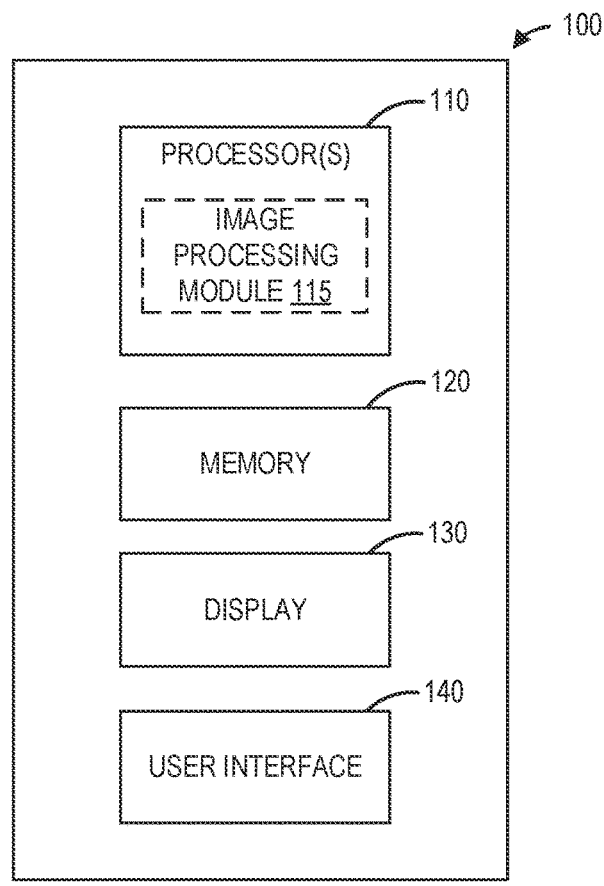
FIG. 1 shows an example diagram of a computing system.

Systems and methods for calculating motion vectors for use in frame interpolation, framerate conversion, or other actions are described herein. As explained previously, motion vectors may be generated which track the difference in position of objects between a current frame (CF) and a previous frame (PF). As explained herein, two types of motion vectors may be utilized to interpolate frames, 1-phase MVs (MV1) and 0-phase MVs (MV0). MV0 represents motion from the PF to CF and MV1 represents motion from CF to the PF. The MVs are generated for each pixel (or group of pixels) on the screen, forming a texture, or collection of MVs for the pixels on the screen. As used herein, a texture is defined to be a map from the collection of pixels in a frame to a collection of one or more numbers (e.g. components of a vector or single numbers).

If motion vectors are used in a framerate conversion process, typical rendering engines output only the MV1 texture in two dimensions. As such, the texture contains no depth content, and only includes information about changes in the relative screen positions as viewed in the reference frame of the virtual camera. Utilizing depth for the pixelwise motion vectors may inform how to compute the 2D components of block motion vectors. Block motion vectors may represent an average of the motion vectors for a block of pixels (e.g., a four by four block of pixels) and may be utilized for frame interpolation or other image processing tasks in order to reduce processing demands, for example. Areas of the scene within certain ranges of depth are called foreground (close to the camera), background (far from the camera), or mid-range (between foreground and background). It may be desirable in image processing to determine which depth range dominates each block of pixels: either foreground, background, or mid-range.

As an example, two objects may be positioned at different distances from a (virtual) camera or viewpoint. If the two objects move in the same direction, in equal world-space distances, the object which is farther away may appear to move a smaller distance in the eye space, creating a parallax effect where objects which are farther away from the viewpoint appear to move less than objects that are closer to the viewpoint.

In the case that a majority of pixels in the block are in the background, the majority of pixels will have small MVs, since MVs are evaluated from the perspective of the camera/viewpoint. If a small amount of the pixels in the block are, for example, in the foreground, the foreground pixels will have motion vectors with larger magnitudes. If all motion vectors within the block were to be averaged, the (relatively few) MVs of the foreground would dominate the average MV. This may misrepresent the relatively small apparent motion of the background pixels, favoring the MVs of the foreground pixels instead.

By including the depth information in the pixel MVs, the dominant depth range of each block may be resolved: either foreground, background, or mid-range. Motion vector values within the block which do not fall into the dominant range may then be disregarded in favor of evaluating the average of only the pixels within the dominant range. In the case of a block dominated by background pixels, the resulting motion vector may more closely match the motion occurring within the frame.

Added depth information may also offer additional flexibility for the image processing module. Depth components of the MVs may be used, for example, as an input to a weighting function which may, in turn, be used to apply varying levels of image correction to areas of different depth.

Thus, according to embodiments described herein, a depth texture may be attached to MV1, which allows for more accurate frame interpolation by taking changes in depth into account. In addition, an MV0 texture with depth may similarly be generated. Both MV0 and MV1 can be used as inputs to framerate conversion algorithms, helping in the interpolation step. As referred to herein, MVs with depth information added are also known as MVDs (motion vectors with depth).

In addition, each frame may be composed of two kinds of objects: those with motion vectors and those without. Objects featuring motion vectors may include moving characters or other objects, the view (virtual camera position) of the user, and moving components of a user interface (for games, this may be a health bar of some similar display of in-game statistics). Objects without motion vectors may include, for example, smoke effects, full- or partial-screen scene transitions (e.g. fades and wipes), and/or particle effects. By separating objects with motion vectors from objects without motion vectors, improved image processing can be performed. Traditionally, algorithms may attempt to exclude screen regions which feature objects without motion vectors. However, this approach is imperfect and may lead to the blending of nearby objects during the process of framerate conversion. Separation of objects with and without motion vectors before transmission to an image processor may then reduce the artifacts caused by the traditionally-known method of exclusion. The approaches described herein make use of two or more channels, which may be logically or physically separate, connected to an image processing module. The two or more channels may include a main channel and an auxiliary channel. In some examples, the objects with motion vectors may be sent on one physical channel (e.g., the auxiliary channel) and the objects without motion vectors may be sent on a separate physical channel (e.g., the main channel). In such examples, the MVDs may be sent on the same channel as the objects with motion vectors. In other examples, the objects with motion vectors and the objects without motion vectors may be sent on the same physical channel (e.g., the main channel), but may be logically separated. In such examples, the MVDs may be sent on the other physical channel (e.g., the auxiliary channel).

Rendering images on a computer system in real-time typically involves the calculation and ordered blending of a plurality of virtual layers. Examples of such layers include a black background layer at the bottom, which may comprise a partially or completely black region on the screen. Applications and games may be drawn above the black background in order to be visible. Note that some layers may be opaque, fully transparent, or partially transparent. The transparency of the pixels within a given layer may be represented by its alpha mask. Above the internal components of the game/application, the GUI for the operating system may be drawn. Traditionally, the components of the operating system and the information from the game/application may be blended together from bottom to top. The blended image may be used directly for display. Blending of all visible objects may obscure objects with motion vectors behind objects without motion vectors. When framerate conversion is performed on the fully-blended image, errors may be introduced in areas containing objects without MVs. The typical technique to separate the regions without MVs from the regions with MVs is called exclusion, and can produce artifacts around the boundaries of regions having objects without MVs, which may be more pronounced in instances when objects without MVs suddenly appear or disappear from the screen. Exclusion operations performed on already-blended images are imperfect and may result in errors (and therefore visual artifacts). In one embodiment discussed herein, exclusion is performed before objects with MVs and objects without MVs are blended. In another embodiment disclosed, exclusion is not performed and motion vectors are instead generated before any objects without motion vectors are drawn on the screen.

By separating objects with MVs and objects without MVs, exclusion algorithms may not be necessary. Separation may therefore allow for the generation of interpolated frame data, even in regions obscured by particle effects. Including depth information in the pixel MV may allow for more accurate block MV calculation, since blocks dominated by pixels in the background may be better represented than by taking the block average.

Traditionally, motion vectors are also sampled on a pixel-by-pixel basis, such each pixel on the screen has an associated MV0 and MV1. However, the sampling resolution for motion vectors can be dynamically reduced or increased. Reducing the resolution may also reduce the computational power required for MV calculation. Since many devices (e.g. smartphones) have limited computational resources and battery life, reductions in computational cost may save on processing power and batter life. As described herein, "pixelwise" or "pixel-by-pixel" may not refer to individual pixels, but may instead refer to collections of pixels in the context of evaluating motion vectors. Low-resolution MV generation may be performed, in some embodiments, by lowering the sampling resolution when calculating the MVs. For example, MVs may only be computed for every second pixel in the x-direction and every second pixel in the y-direction. For example, if the original video resolution is 1920×1080, the MVs may be sampled to form a 960×540 texture. The low-resolution pixelwise MVs may then be averaged in a block form, using, for example, blocks representing 4×4 patches of pixels.

The motion vectors described here may be generated on a pixel-by-pixel basis, and translated to a block form with a depth texture. The block motion vectors may be split into separate channels for objects with motion vectors and objects without motion vectors to be sent to an image processing module. The image processing module may perform visual enhancements using the block motion vectors, such as framerate conversion, for example. Framerate conversion refers to the systematic process of generating one or more extra frames from the visual information of a previous frame PF and the current frame CF. The extra frames are called interpolated frames, or IFs. The IFs may be sequentially displayed between PF and the CF. As an example, framerate conversion may be used to generate one IF between every given pair of frames, resulting in an output with double the framerate of the original video. Generation of IFs may be desirable for their low computational cost, as generating more frames from the game engine itself may require a higher degree of computational complexity.

To be used in image processing techniques, the 0- and 1-phase MVDs may be combined with graphical data from the game engine itself. MVDs coupled with game objects having MVDs are herein referred to as GMVDs. GMVDs may be created, for example, by prepending or appending the MV data to the game frame data before transmission along a primary or auxiliary channel. Two primary example methods are discussed herein for adding motion vectors to game data: in one example, only objects with MVs are considered when forming the GMVD. GMVDs using only objects with motion vectors are herein referred to as G1MVDs. In another example, the GMVD is computed using both objects with MVs and objects without MVs. In the case where both objects with MVs and objects without MVs are used, the GMVD may be accompanied by a mask, which may be a layer to accurately map areas of the image without motion vectors. The mask may be used to apply special processing to the areas affected by objects without MVs.

Aspects of the present disclosure are described herein with reference to flowchart illustrations and/or block diagrams of methods, apparatus, and computer program products according to the embodiments disclosed herein. Insofar as such block diagrams, flowcharts, and/or examples contain one or more functions and/or operations, it will be understood by those of skill in the art that each function and/or operation within such block diagrams, flowcharts, or examples can be implemented, individually and/or collectively, by computer readable instructions using a wide range of hardware, software, firmware, or virtually any combination thereof. The described systems are exemplary in nature, and may include additional elements and/or omit elements. The subject matter of the present disclosure includes all novel and non-obvious combinations and sub-combinations of the various systems and configurations, and other features, functions, and/or properties disclosed. Thus, the methods may be performed by executing stored instructions on machine readable storage media with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

FIG. 1 schematically depicts an example of a computer system 100 which may include one or more processors 110, volatile and/or nonvolatile memory 120 (e.g. random-access memory (RAM) and/or one or more hard disk drives (HDDs)). The processors 110 may comprise one or more CPUs (central processing units), GPUs (graphics processing units), and/or one or more image processing modules, such as image processing module 115. The computer system may also include one or more displays 130, which may comprise any number of visual interface technologies. In addition, example embodiments may include a user interface 140, e.g. keyboards, computer mice, touch screens, controllers, etc. to allow users to provide input to the computer system. In some embodiments, the computer system may be a mobile phone or tablet. The disclosure herein refers primarily to systems describing the transmission of data within the processors 110. Data transmission within the processors may include the data generated by the CPUs and transmitted to the image processing module 115. Note that the image processing module 115 may be hardware units external to the CPUs or may be programs operating within the CPUs.

As used herein, the terms "system" or "module" may include a hardware and/or software system that operates to perform one or more functions. For example, a module or system may include a computer processor, controller, or other logic-based device that performs operations based on instructions stored on a tangible and non-transitory computer readable storage medium, such as a computer memory. Alternatively, a module or system may include a hard-wired device that performs operations based on hard-wired logic of the device. Various modules or units shown in the attached figures may represent the hardware that operates based on software or hardwired instructions, the software that directs hardware to perform the operations, or a combination thereof.

It should be noted that the techniques discussed herein apply not only to games, but to any animated renderings of 3D models, though the advantages offered by this method may be most noticeable in real-time rendering situations.

Figure 2:
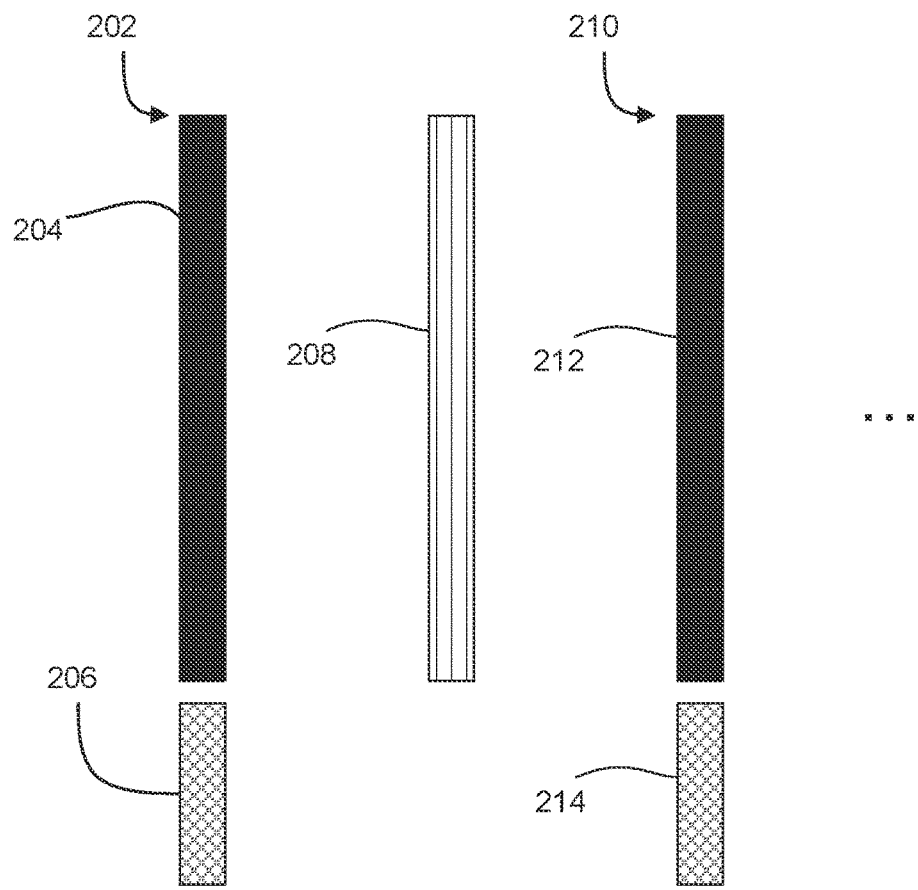
FIG. 2 shows a representation of output from the computing system, comprising game frames, interpolated frames, and motion vectors with depth.

FIG. 2 shows an example sequence of output frames generated by, for example, a 3D game or video. The frames may be displayed in order, from left to right. The first frame is PF 202. PF 202 may represent the frame previously generated by the game engine. PF 202 may include two primary components: the previous frame visual information 204 from the game and the previous frame motion vectors with depth (MVDs) 206. The MVDs 206 may comprise the 0- and 1-phase MVDs. The current frame (CF) 210 may include similar components: the current frame visual information 212 and the current frame MVDs 214.

Both the PF 202 and CF 210 may be generated by the processors 110 (which may include, for example, CPUs or GPUs) of the computer. The image processing module 115 may use the information from PF 202 and the information from CF 210 to create one or more interpolated frames (IFs) 208 to be displayed between PF 202 and the CF 210. The process may generate any number of IFs 208. Generation of the IFs 208 allows for framerate conversion (FRC).

FIGS. 3 through 10 show figures which combine aspects of blending layers together, sending images from one component to another, and sending data from one method to another within the same processor. In the following figures, solid lines represent data transfer from one method to another, dashed lines represent blending (where the tail of each line represents a lower layer than the head of that line), and dotted lines represent transmission of data from one processor to another (which may include an image processing module in some examples). As described herein, blending is the process of drawing pixels from a first layer on the screen, then overwriting them with pixels from a second layer. The degree to which the first layer is overwritten corresponds to the transparency of the second layer. Low transparency (e.g. high opacity) may result in an almost complete overwriting of the pixels within the first layer. High transparency may result in the pixels of the first layer being visible below the pixels of the second layer. Transparency may be coded through the use of an alpha mask, while colors of the layers may be specified by red, green, and blue (RGB) channels. Inclusion of the alpha mask creates the red-green-blue-alpha (RGBA) channels. In examples described herein, motion vectors may be attached to layers of visual information. The motion vectors may not directly represent visual data, and may have no inherent visual representation. Therefore, they may be excluded from the blending process. If motion vectors are packaged as visual data within the RGBA transfer method, they could remain unaffected, for example, by blending if the layers above the layers with motion vectors are perfectly transparent.

Figure 3:
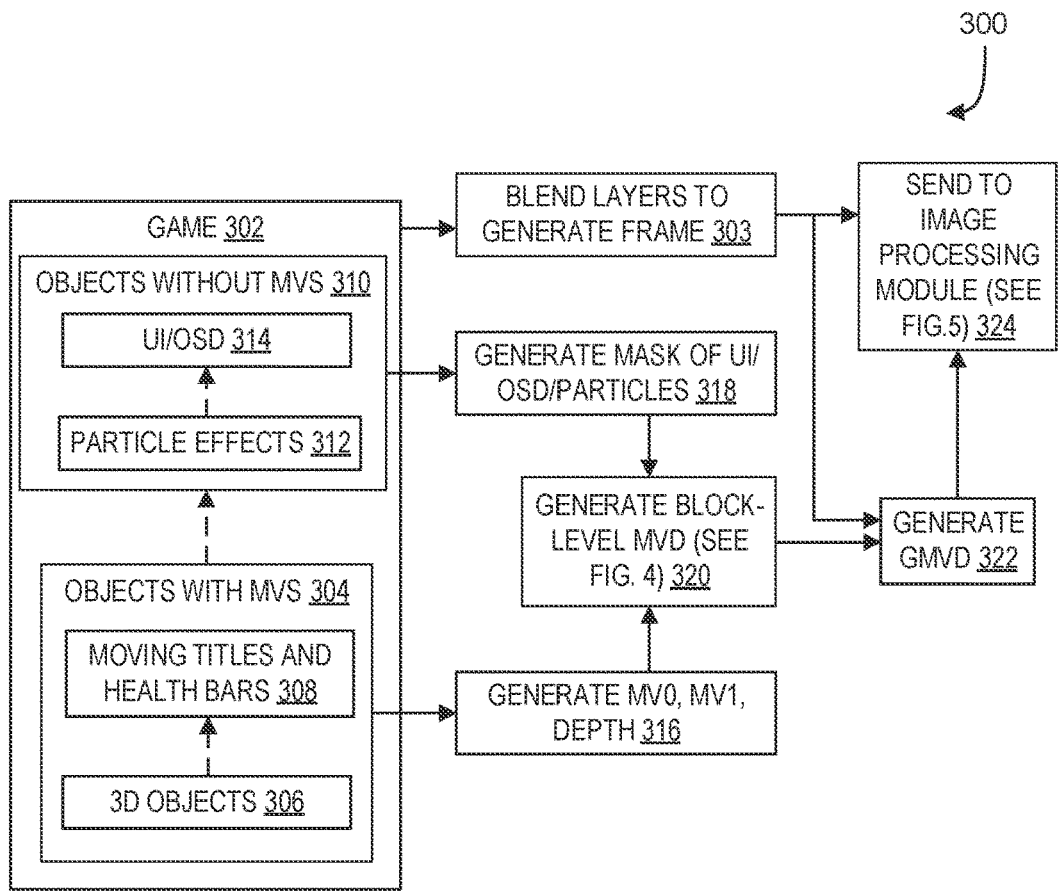
FIG. 3 shows an example of a pipeline used to generate output to be sent to an image processing module.

FIG. 3 shows an example pipeline 300 for the generation of GMVDs in the context of rendering frames of a video game. The methods within pipeline 300 may be executed on one or more processors (such as one or more processors 110) to produce output (CF and PF image data and MVDs) for an image processing module 115. In pipeline 300, information from a game 302 is combined to generate a GMVD by process 322 as output. The game 302 may include 3D models that may be updated based on user input in order to render objects and background as 2D frames on a display. The game may be a set of computer instructions stored in volatile and/or nonvolatile memory 120 and executed on one or more processors 110. The game 302 may output information in a plurality of layers to be rendered. To create a frame, the layers may be blended from the bottom (e.g. 3D objects 306) to the top (e.g. an UI/OSD 314). The layers may be blended to generate a 2D frame, as indicated by process 303. In addition to the frame, the game may provide (or calculate) other information about the 3D objects within the scene, such as their position within 3D space (as opposed to 2D screen space) and their depth. Frame data and other information may be provided at intermediate steps within the game. The information output by the game 302 may include objects with MVs 304 and objects without MVs 310. Objects with MVs may be rendered on lower layers of the plurality of layers, e.g. objects without MVs may be applied on layers above objects with MVs. At the lowest level are 3D objects 306. 3D objects 306 may include 3D models, characters, virtual cameras, and more. The 3D objects 306 feature motion vectors, since the 3D objects move in space. Motion vectors may be computed using representations of the 3D objects 306 in various internal rendering spaces, which may include, for example, model space, world space, screen space, and more. Above the 3D objects 306 themselves are moving titles and health bars 308. Moving titles and health bars 308 may be attached to 3D objects 306 within the game, and may therefore transform between frames in a manner similar to 3D objects 306.

Above objects with MVs are objects without MVs 310. Objects without MVs 310 may include particle effects 312, such as smoke, fog, and bombs. Particle effects 312 may not have motion vectors because the particle effects are rendered independently of the 3D scene. Particle effects 312 may be rendered on top of the 3D scene such that motion vector calculation is not possible. Objects without MVs 310 may obscure or occlude objects with MVs 304, resulting in imperfect framerate conversion. Objects without MVs 310 may also include the user interface/on-screen display (UI/OSD) 314. The UI/OSD may be an in-game menu, static health bar, or other features of the UI. The UI/OSD may be static on the screen.

At 316, the MV0, MV1, and depth textures are computed for the objects with MVs 304. The MV0 texture represents motion from the previous frame to the current frame and MV1 represents motion from the current frame to the previous frame. The MV0 and MV1 textures may be 2D, representing the x and y motion of the objects with MVs 304. The depth textures created in 316 may represent the z-coordinates of the objects with MVs 304. Depth textures may be generated for both the current frame and the previous frame.

To address the objects without MVs separately, a mask of all regions containing objects without MVs may be created. For example, as indicated at 318, a mask of the UI/OSD and particle effects may be generated. The mask may be a grid of pixels that is fully transparent in areas not containing objects without MVs and fully opaque in areas with objects without MVs.

The MV0, MV1, and depth information generated in 316 may be coupled with the mask generated AT 318 to create block-level motion vector with depth (MVD) at 320. The block-level MVD generated at 320 is a motion vector texture with depth, representing the motion of objects with MVs 304. The block-level MVD generated at 320 may be generated via method 400 of FIG. 4, which is explained below. The block MVDs may comprise two separate blocks of data: the block MVD1 texture and the block MVD0 texture.

Figure 5:
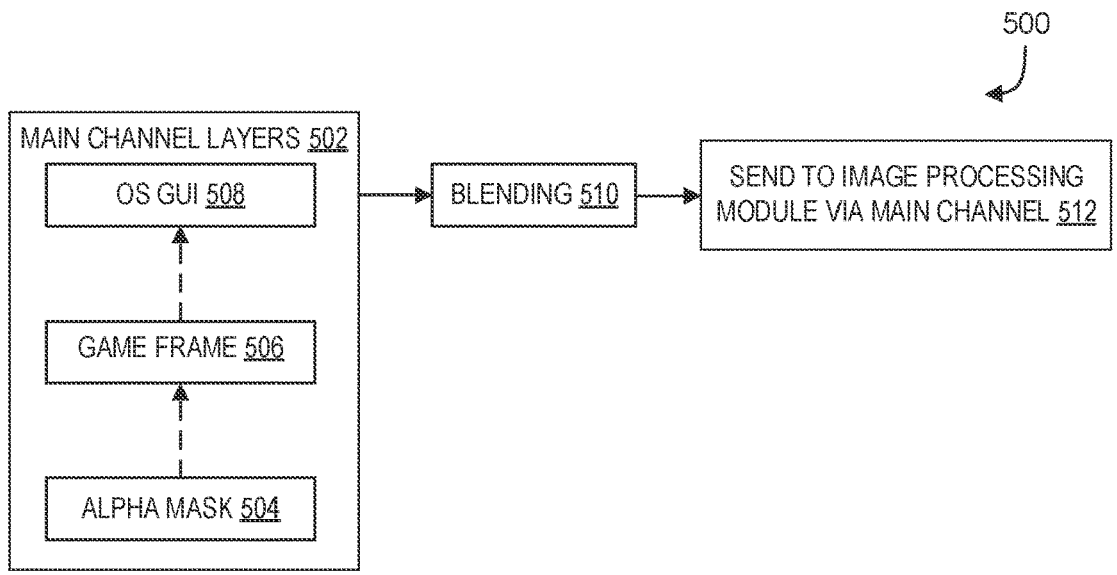
FIG. 5 shows two pipelines for sending information to an image processing module, corresponding to the pipeline of FIG. 3.
Figure 5:
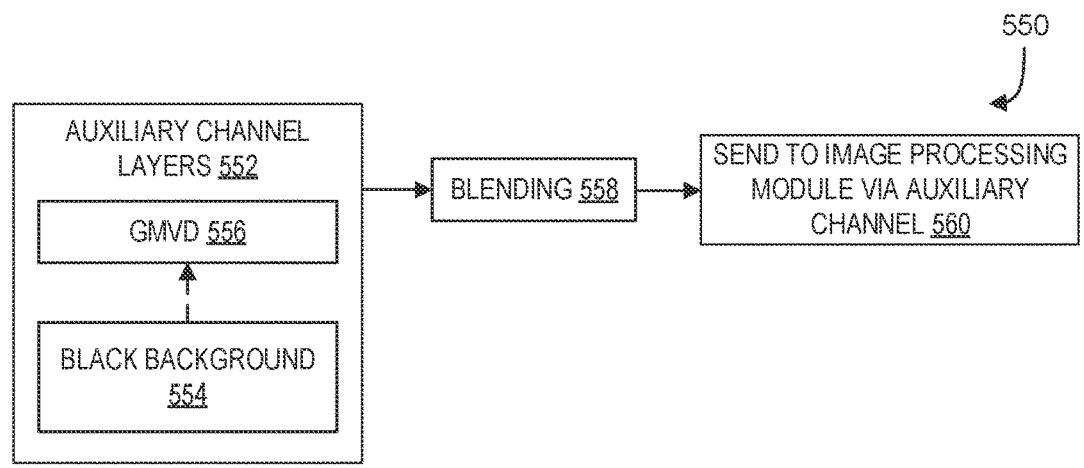

The game frame may be generated by rendering and blending all objects generated by the game 302 from the bottom (e.g. 3D objects 306) to the top (e.g. the UI/OSD 314). Therefore, the game frame includes both objects with MVs 304 and objects without MVs 310. The pipeline 300 may generate a GMVD output in process 322 by attaching a duplicate of the blended frame data generated in process 303 to the block-level MVD generated at 320. The GMVD output therefore includes, by extension, both objects with MVs 304 and objects without MVs 310. The GMVD may be generated, for example, by appending (or prepending) the block MVD generated at 320 to the game's output frame generated in process 303. Pipeline 300 ends by sending both the GMVD generated at 322 and the game frame generated in process 303 to the image processing module at 324. Layers from outside of the game, such as layers from the operating system, may also be sent to the image processing module. Data transfer may be performed over two channels. FIG. 5 illustrates additional details for the contents and blending order of the data sent to the image processing module via both channels.

Figure 4:
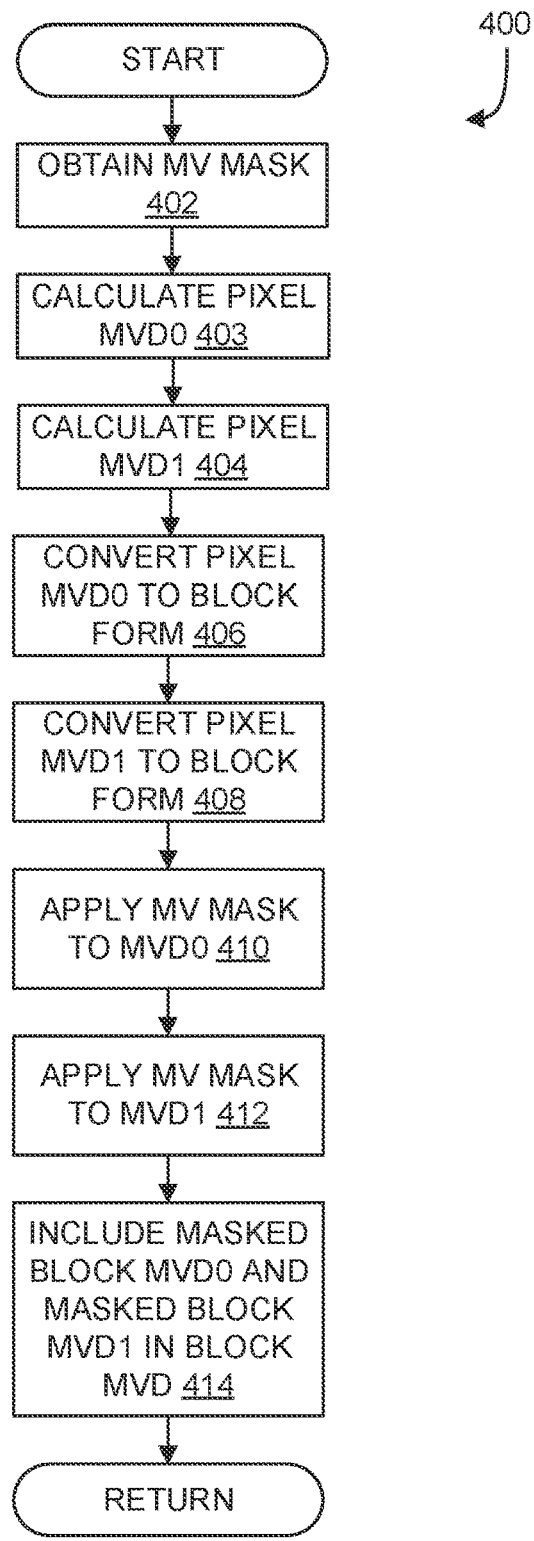
FIG. 4 shows a method for computing the masked block MVD used in FIG. 3.

FIG. 4 shows a method 400 for a method of generating MVDs. Method 400 may execute during the generation of the block-level MVDs at 320 of pipeline 300. Method 400 may take as input five sources: a PF depth texture (e.g., the depth value for each pixel of the previous frame), a CF depth texture (e.g., the depth value for each pixel of the current frame), pixelwise MV0 (e.g., the MV0 for each pixel of the current frame), pixelwise MV1 (e.g., the MV1 for each pixel of the current frame), and an MV mask. At 402, method 400 includes obtaining an MV mask, e.g. from process 318 of pipeline 300. The PF depth texture and the pixelwise MV0 texture may be combined to calculate the pixelwise MVD0 at 403. Similarly, the CF depth texture and the pixelwise MV1 texture may be combined to calculate the pixelwise MVD1 texture at 404. Combining of the motion vectors and depth textures may be performed by a function such as $((MV_x,MV_y),\text{depth}) \rightarrow (MV_x,MV_y,\text{depth})$.

The pixelwise MVD0 calculated at 403 may be converted into block form at 406 using method 800 of FIG. 8 (discussed below). Similarly, the pixelwise MVD1 calculated at 404 may be converted into block form at 408. At 412, the MV mask obtained at 402 may be applied to the block MVD0 calculated at 406. The same mask may also be used to calculate the masked block MVD1 at 412. Both the masked block MVD0 generated at 410 and the masked block MVD1 generated at 412 may be included together as the MVD in 414. The block MVD generated at 414 of method 400 may be coupled with a frame of the game (such as the frame produced by process 303) to produce a GMVD in process 322.

FIG. 5 shows two pipelines 500 and 550 for the blending and transfer of visual data generated by the processor(s) 110, where the blended visual data is transferred to the image processing module 115. The example pipelines of FIG. 5 show the transfer via two channels of information: a main channel and an auxiliary channel. The channels may be physically or logically separate (see FIG. 10).

The main channel layers 502 comprise, in order of blending, an alpha mask 504, a game frame 506 (as generated in process 303 of pipeline 300), and an OS GUI 508. The lowest blending layer for transfer via the main channel is the alpha mask 504. The alpha mask 504 indicates how to blend between the main channel and the auxiliary channel inside of the image processing module 115. Above the alpha mask layer is the game frame 506. The game frame 506 comprises a game frame, such as the frame generated in process 303. The OS GUI 508 may be blended above the game layer. The OS GUI 508 may comprise visual information from the operating system, such as navigation buttons, rounded corners, and status (battery, Wi-Fi, cellular) indicators. Blending the main channel layers 502 (in order) is performed at 510 and the blended layers may then be transferred to the image processing module via the main channel, as indicated at 512.

The pipeline 550 comprises the blending and transfer of auxiliary channel layers 552. The auxiliary channel layers 552 may comprise, in order from bottom to top, a black background 554 and an GMVD 556. In some examples, the black background 554 may be drawn by the operating system. Note that the background drawn by the operating system may, in general, be a different color or set of colors. The GMVD 556, which is a non-limiting example of the GMVD generated at 322 of pipeline 300, may be blended above the black background. It should be noted that blending the GMVD above the black background may only blend the game frame information contained in the GMVD and the black background 554. The MVD contained in the GMVD may be unaffected by the blending. The auxiliary channel layers 552 may be blended at 558 and transferred to the image processing module via the auxiliary channel at 560.

It should be noted that pipeline 550 provides a non-limiting example for how to transmit game data via the auxiliary channel. In other examples, the GMVD 556 may be replaced with the block-level MVD texture alone; this would allow for the motion vector texture to be transmitted separately from the other video data. Since the entire game frame 506 is transmitted in the main channel layers 502, including a copy of the game frame within the GMVD 556 may not be desirable. Transmitting the MVD instead of the GMVD may be accomplished, for example, by not duplicating the game frame generated in step 303 and instead only including the block-level MVD generated in step 320.

Figure 6A:
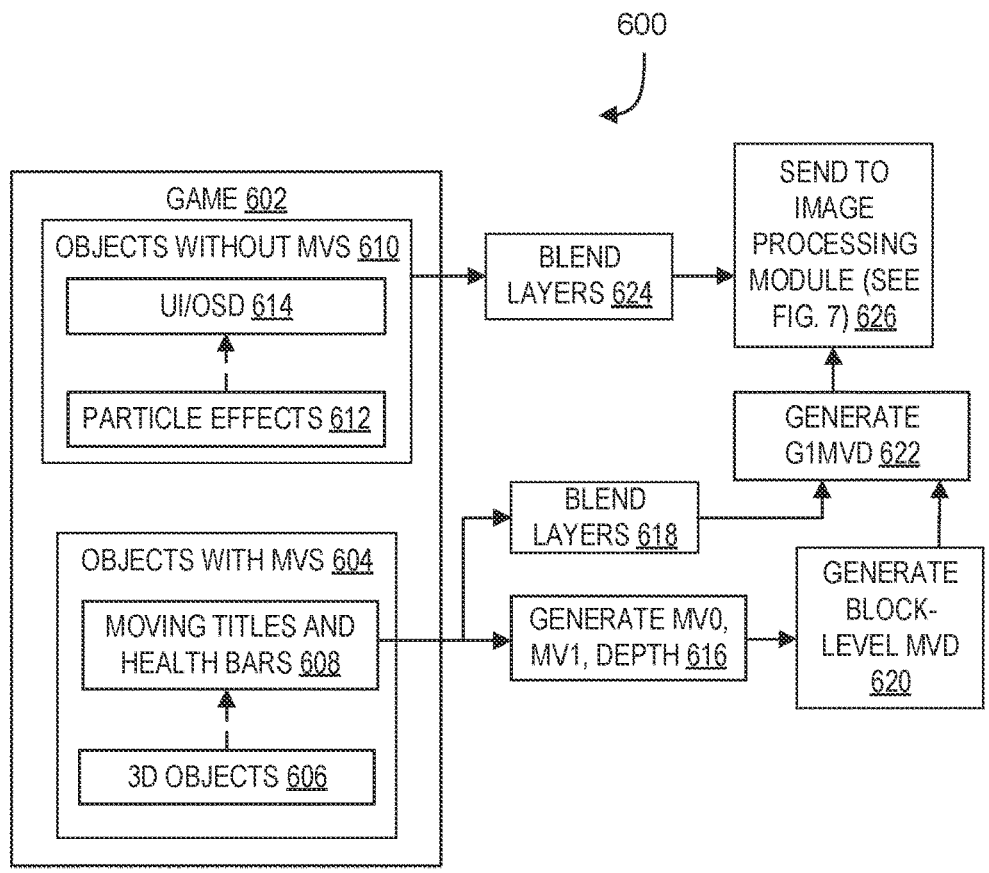
FIG. 6A shows a second example of a pipeline used to generate output to be sent to an image processing module.

FIG. 6A shows a pipeline 600 for a second embodiment of a dual-channel transfer method for a game. Similar to the first example embodiment (see FIG. 3), calculations may be performed within the context of a game 602 which may execute on one or more processors 110. Objects generated by the game 602 may be divided into two groups: objects with MVs 604 and objects without MVs 610. Objects with motion vectors may comprise one or more categories, such as 3D objects 606 and moving titles and health bars 608 which may move within the 3D scene.

Objects without motion vectors may comprise particle effects 612, such as smoke and bombs and a UI/OSD 614. The objects without MVs 610 may be blended together at 624 to produce a partial frame featuring only objects without MVs. The objects without MVs 610 blended together in 624 may be sent to the image processing module at 626. Data sent to the image processing module at 626 may be sent across two channels and include additional data. The process of sending the objects without MVs to the image processing module at 626 is discussed in more detail below with respect to FIG. 7. Note that the objects with MVs 604 and the objects without MVs 610 are not blended together within the game itself. The entire game frame may instead be generated by the image processing module 115, since both the blended layers of the objects with MVs 604 (included within the G1MVD generated at 622 and described in more detail below) and the blended layers of the objects without MVs, generated at 624, may be sent to the image processing module at 626.

Using data from the objects with MVs 604, the pixelwise information for the MV0, MV1, and depth textures may be generated at 616, which may also be performed on the processor(s) 110. Contrary to the first embodiment, the block-level MVD may be generated at 620 using only the information from the objects with MVs 604. The block-level MVDs generated at 620 may be generated according to the method 650 of FIG. 6B. At 618, the objects with MVs 604 may be rendered and blended together from bottom to top. The block level MVDs may be appended (or prepended) to the blended objects with MVs generated at 618 to produce the G1MVD at 622, which may be output to the image processing module at 626, alongside the rendered and blended objects without MVs generated in 624.

The pipeline 600 of FIG. 6A may be advantageous to the pipeline 300 of FIG. 3, since the motion vectors produced at 616 do not depend on the areas affected by objects without MVs. Since no mask is used in pipeline 600, as opposed to the mask generated at 318 of pipeline 300, motion vectors may account for motion hidden behind occluded areas. Therefore, improved FRC may be achieved, especially in instances where objects without MVs suddenly appear and/or disappear within the frame. Pipeline 600 may therefore offer improved image quality. It should be noted that the pipeline 300 still offers advantages over traditional exclusion methods, since the mask may be determined before any blending occurs, eliminating the need to reverse-engineer static areas of the screen with another algorithm.

Figure 6B:
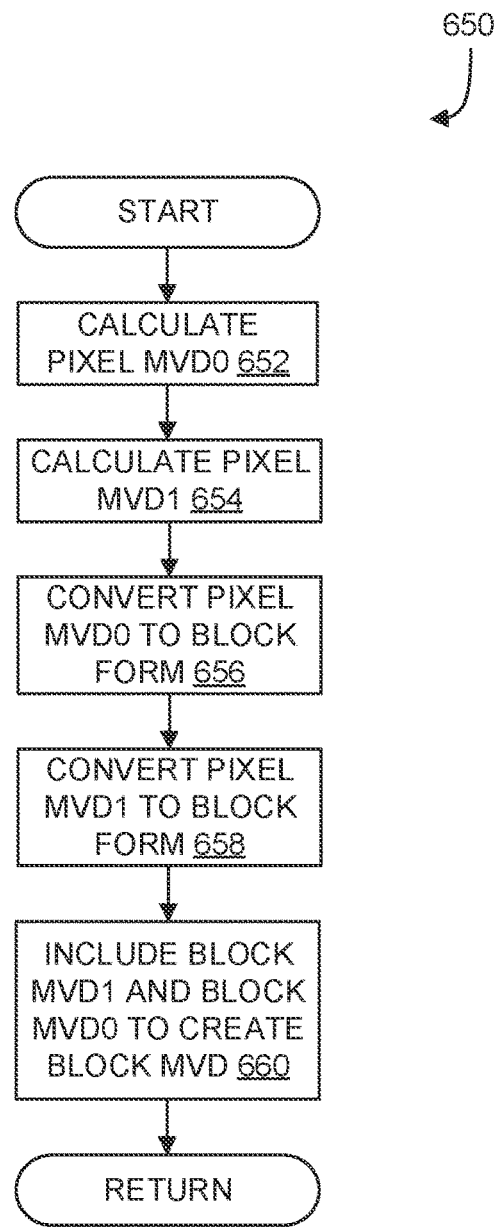
FIG. 6B shows a method to generate the block MVD used in FIG. 6A.

FIG. 6B shows a method 650 to generate block-level MVDs which may be invoked at 620 of pipeline 600. Method 650 includes calculating the pixel MVD0 at 652 and calculating the pixel MVD1 at 654. Similar to FIG. 4, MVD0 and MVD1 may be calculated by appending the appropriate values of depth to the 2D MV0 and MV1 generated at 616 of FIG. 6A. The pixel MVD0 may be converted to a block MVD0 at 656 using method 800. Similarly, the pixel MVD1 may be converted to a block MVD1 at 658 (also using method 800). Method 650 produces the block MVD at 660 as output by including both the block MVD0 generated in 656 and the block MVD1 generated in 658.

Figure 7:
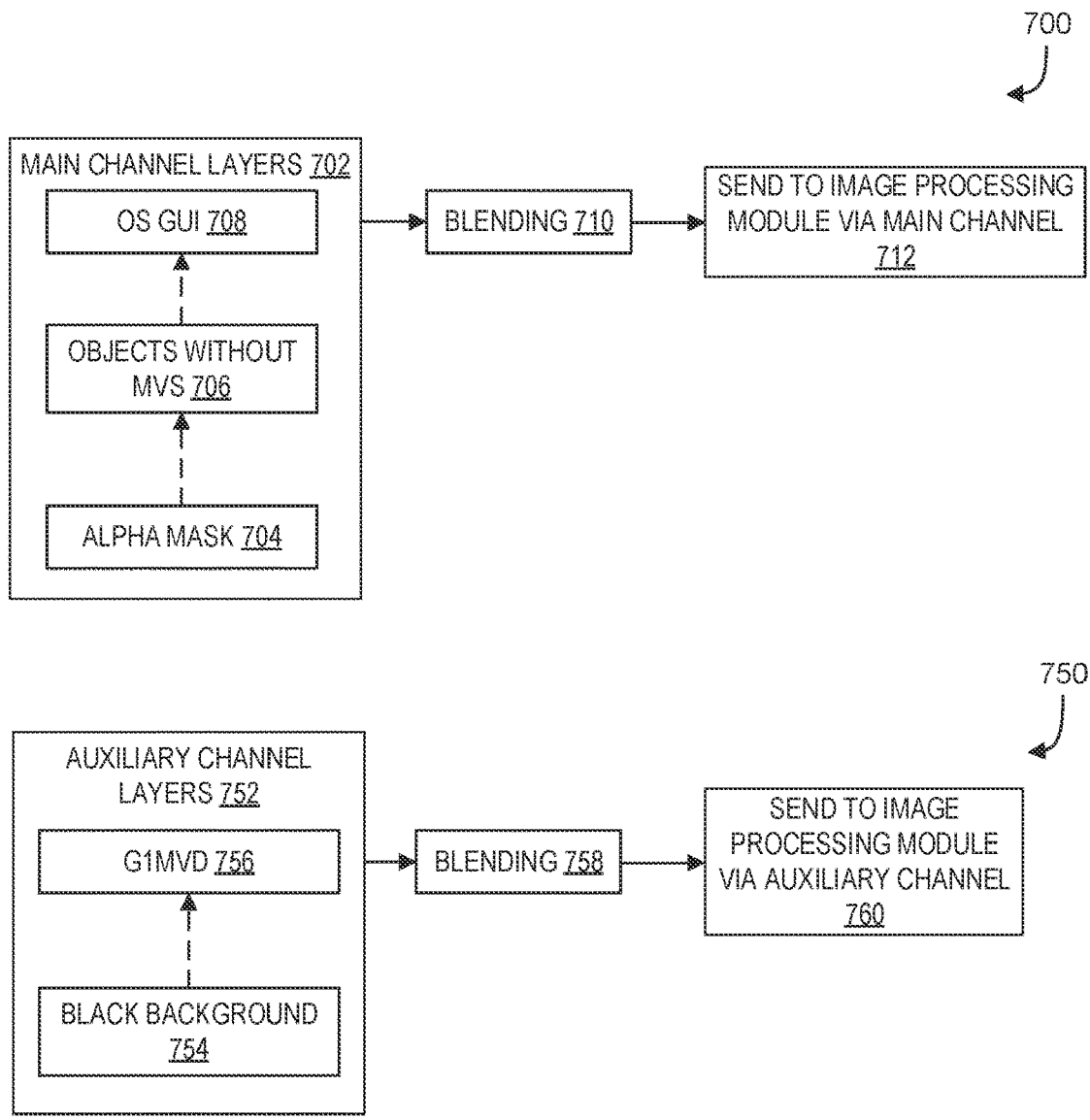
FIG. 7 shows two pipelines for sending information to an image processing module, corresponding to the pipeline of FIG. 6A.

FIG. 7 shows pipeline 700 and pipeline 750 which represent an example of blending and transfer of game data to the image processing module 115 via two channels. Pipeline 700 represents the blending order and transfer of main channel layers 702. The main channel layers 702 may comprise, in order of blending, an alpha mask 704, objects without MVs 706, and an OS GUI 708. The alpha mask 704 may represent how the visual information from the main channel and the visual information from the auxiliary channel are blended within the image processing module. The objects without MVs 706 may be, as a non-limiting example, the layers blended as the result of the blending performed at 624 of FIG. 6A and may be blended one layer above the alpha mask 704. The OS GUI 708 (which may be similar to the OS GUI 508) may be blended on top of the objects without MVs 706. The main channel layers 702 may be blended at 710 and sent to the image processing module via the main channel, as indicated at 712.

Pipeline 750 represents the blending order and transfer of auxiliary channel layers 752. The auxiliary channel layers 752 may comprise, in order of blending, a black background 754 and a G1MVD 756. The black background 754 and G1MVD 756 layers are blended at 758 and the blended layers are sent to the image processing module via the auxiliary channel at 760. Since the G1MVD contains the motion vectors and the blended result of objects with MVs together and the objects without MVs are transmitted on the main channel, the complete set of in-game graphics may be included between the main channel and the auxiliary channel. Blending of the objects with MVs and the objects without MVs may take place within the image processing module 115. Blending of the two channels of information may be specified by the alpha mask 704.

Figure 8:
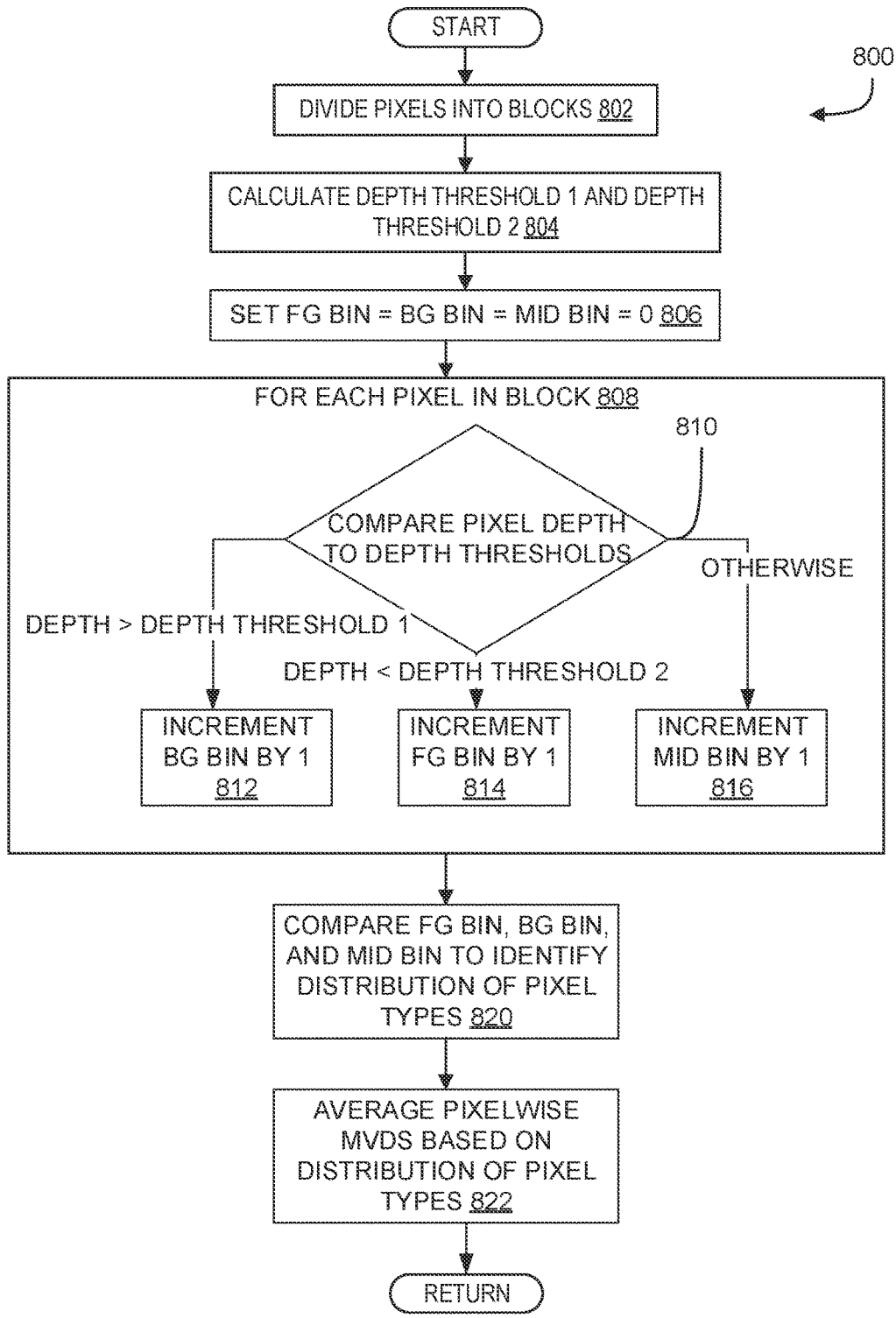
FIG. 8 shows a method for converting a pixelwise MVD to a block MVD.

FIG. 8 shows a method 800 to compute a block MVD from a pixel-by-pixel MVD. The method 800 occurs during the pixel MV to block MVD conversion performed at 620 of pipeline 600, at 408 of method 400, and at 410 of method 400, which may be computed using the processor(s) 110 and instructions in volatile and/or nonvolatile memory 120. At 802, the MVDs corresponding to individual pixels are divided into a plurality of blocks, e.g. finitely sized, collections of MVDs corresponding to rectangular groups of pixels. In one example (see FIG. 9), the blocks may be four-by-four squares of pixels. In general, the blocks do not need to be equally-sized or square. At 804, two depth thresholds (depth threshold 1 and depth threshold 2) are calculated. The depth thresholds may be given, for example, by $$DepthThreshold_1 = Depth_{Max} - \frac{Depth_{Max} - Depth_{Min}}{4},$$

$$DepthThreshold_2 = Depth_{Min} + \frac{Depth_{Max} - Depth_{Min}}{4},$$

where $Depth_{Max}$ is the maximum depth value for the block and $Depth_{Min}$ is the minimum depth value in the block. In this example, a greater depth corresponds to an object further away from the camera or viewer.

At 806, foreground (FG), background (BG), and mid-range (MID) bins are created and each given initial values of 0. The sizes of each bin may be stored as $N_{FG}$, $N_{BG}$, and $N_{MID}$. As indicated at 810, for each pixel in the block, the depth value of the pixel (and therefore the depth value of the 2.5D motion vector) is compared to the two thresholds at 810. If the depth is greater than depth threshold 1, the BG bin is incremented at 812. If the depth is less than depth threshold 2, the FG bin is incremented at 814. Otherwise, the MID bin is incremented at 816. Note that for each pixel within the block, only one bin should be incremented.

Once each pixel within the block has been compared, the values of the FG bin, the BG bin, and the MID bin are compared at 820 to identify a distribution of pixel types. Pixel type distribution identification may be performed to determine whether or not the depth components of the MVs exhibit a bimodal distribution; a bimodal distribution may indicate the presence of two objects within the block: a foreground object and a background object. If a bimodal distribution is not detected, disregarding the MVDs with extreme depth components may result in a more stable distribution. In such a case, the mid-range pixels should be averaged. However, since the disclosed methods create only three bins to classify pixels, and the number of pixels in each block may be small (e.g. 16), a bimodal distribution may appear to be skewed towards either the foreground and background bins. Either case may indicate the presence of a foreground object. The size of the predominant bin, herein labelled as N, may be given, for example, by a process specified by the following pseudo-code:

```
IF N_MID < N_FG THEN
    IF N_FG > K_1 N_BG THEN
        SET N = N_FG
    ELSE SET N = N_BG
    END IF
ELSE IF N_MID < N_BG THEN
    IF N_FG > K_2 N_BG THEN
        SET N = N_FG
    ELSE SET N = N_BG
    END IF
ELSE
    SET N = N_MID
END IF
```

Note the two constants, $K_1$ and $K_2$, may be chosen such that $0 \leq K_1 \leq 2$ and $K_1 \leq K_2$. Both constants may be determined empirically to achieve stable distributions in the depth components of the block MVs. In some embodiments, $K_1 = K_2 = 0$. In this way, when a bimodal distribution is detected (e.g., where at least one foreground pixel and at least one background pixel are included in a block) such that a foreground object and a background object are detected in the block, only the MVDs for the foreground pixels are averaged and set as the block MVD for the block (even if more background pixels are present in the block than foreground pixels), which may allow for the preservation of the foreground object in the interpolated frame(s) that may otherwise be missed. When a bimodal distribution is not detected, only one object is detected in the block (whether foreground or background) and only the MVDs for the mid-range pixels are averaged and set as the block MVD for the block.

At 822, method 800 includes averaging the MVDs based on the distribution of the pixel types. For example, the block MVD may be given by a formula such as $$MVD_{block} = (MV_x, MV_y, \text{depth})_{block} = \frac{1}{N} \sum_{i=1}^{N} (MV_x, MV_y, \text{depth})_{pixel\,i},$$

where N represents which bin is being averaged over, as determined at 820 above. The sum is performed over all pixelwise MVDs (either MV0 or MV1) within the bin corresponding to N, e.g. if $N=N_{BG}$, the sum is performed over all background pixels, etc. Addition here is performed according to standard vector addition, e.g. $(x_1, y_1, z_1)+(x_2, y_2, z_2)=(x_1+x_2, y_1+y_2, z_1+z_2)$. Method 650 then returns, using the averaged MVD as its return value.

Figure 9:
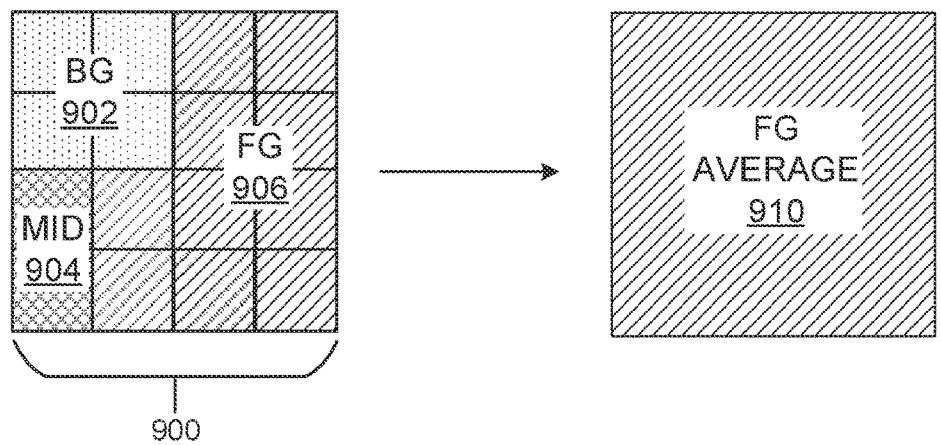
FIG. 9 shows an example diagram of converting from a pixel MVD to a block MVD, using the method of FIG. 8 as a non-limiting example.

FIG. 9 shows an example of processing the pixel MVs into the block MVs. In this case, a block of pixels with MVs 900 includes a collection of foreground range pixels with MVs 906 (shown in FIG. 9 as being hatched in one direction for visual clarity), a collection of background range pixels with MVs 902 (shown in FIG. 9 as a dotted pattern for visual clarity) and a collection of mid-range pixels with MVs 904 (shown in FIG. 9 as being cross-hatched for visual clarity) are shown. Depth is used to decide which range each pixel belongs to, e.g., pixels with MVs within a first depth range are assigned as being background pixels, pixels with MVs within a second depth range are assigned as being mid-range pixels, and pixels with MVs of a third depth range are assigned as being foreground pixels. Since the majority (10 of 16) of pixel MVs within the block of pixels with MVs 900 fall within the foreground depth range, the depth values of the foreground range pixel MVs 906 are averaged to produce a single depth value that is applied to all pixel MVs of the block MV, thereby generating a block MV 910. In addition, the x- and y-components (not shown) of the foreground MVs are also averaged and output in the block MV. The block MV is therefore comprised of three semi-independent textures: the x-component, the y-component, and the depth component, each independently averaged within the pixels fitting within the depth range. This technique applies to both MV1 and MV0.

Figure 10:
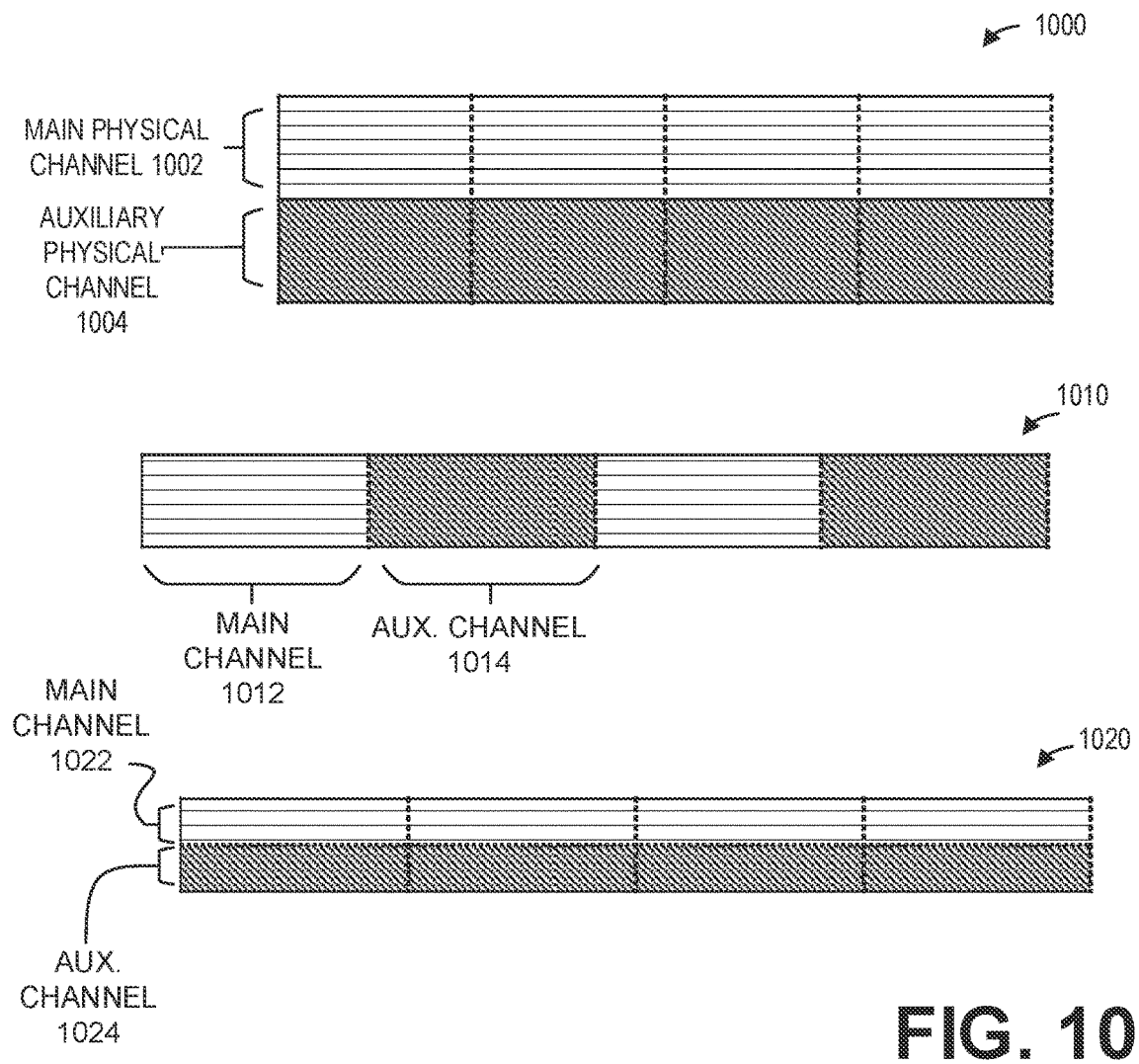
FIG. 10 shows three diagrams corresponding to three ways of transmitting data over two channels.

FIG. 10 shows the different methods for transmitting data on two separate channels: a main channel and an auxiliary channel. In a first example 1000, a main physical channel 1002 and an auxiliary physical channel 1004 are used to simultaneously transmit two different kinds of data, such as outputs of pipeline 700 (e.g. on the main channel) and pipeline 750 (e.g., on the auxiliary channel) of FIG. 7, for example. Note that the sizes of the two channels need not necessarily be equal. In some examples, the main channel and the auxiliary channel may be separate wires (or sets of wires) or circuit board traces (or sets of circuit board traces) leading from the CPU(s) to the image processing module. In other examples, the main and auxiliary channels may be data cached in separate registers within volatile and/or nonvolatile memory 120, accessible to the image processing module. A second example is shown by diagram 1010 with a time-separated main channel 1012 and a time-separated auxiliary logical channel 1014. In diagram 1010, a single physical channel (e.g., a single wire (or a single set of wires), a single circuit board trace (or a single set of circuit board traces), or a single data cache) alternately sends data to the main channel and to the auxiliary channel. In a third example 1020, a single physical channel (e.g., a single wire (or a single set of wires), a single circuit board trace (or a single set of circuit board traces), or a single data cache) is divided into two spatially-separated channels of fixed size, a main channel 1022 and an auxiliary channel 1024. Dividing the channel allows information to be simultaneously transferred over the single channel.

The technical effect of generating an MV1 texture and an MV0 texture of a current frame, where the MV1 texture and the MV0 texture each include depth values, is that the MV1 texture and MV0 texture may be converted to MV1 and MV0 blocks, respectively, using the depth values so that the resulting motion vector may more closely match the motion occurring within the frame. Another technical effect is the block MV1 and block MV0 with depth values may be used to perform frame interpolation, thereby increasing a framerate. A further technical effect of separating objects with and without motion vectors before transmission to an image processor is that artifacts caused by the traditionally-known method of exclusion may be reduced.

The disclosure also provides support for a method, comprising: generating, based on a current frame to be rendered, a block-level motion vector with depth (MVD) texture that comprises a set of block-level motion vectors each having an associated depth value, and outputting the block-level MVD texture for image processing on a first channel and outputting at least a portion of the current frame on a second channel. In a first example of the method, the set of block-level motion vectors includes a first set of block-level 0-phase motion vectors with depth (MVD0s) and a second set of block-level 1-phase motion vectors with depth (MVD1s), each block-level MVD0 and MVD1 having an associated depth value, and wherein each block-level MVD1 is generated from a respective group of pixel-level MVD1s, each pixel-level MVD1 representing a change in a position of an object at that pixel from the current frame to a previous frame, and wherein each block-level MVD0 is generated from a respective group of pixel-level MVD0s, each pixel-level MVD0 representing a change in a position of the object at that pixel from the previous frame to the current frame. In a second example of the method, optionally including the first example, generating each block-level MVD1 comprises: identifying, for each pixel block in a plurality of pixel blocks, a distribution of pixel types in that pixel block, converting each pixel block to a respective MVD1 block based on the distribution of pixel types. In a third example of the method, optionally including one or both of the first and second examples, converting each pixel block to a respective MVD1 block based on the distribution of pixel types comprises: determining that a first selected pixel block has a non-bimodal distribution such that only or predominantly mid-range pixels are present, and in response, calculating an average MVD1 over only mid-range pixels in the first selected pixel block, determining that a second selected pixel block has a bimodal distribution such that the second selected pixel block includes at least one foreground pixel and at least one background pixel, and in response, calculating an average MVD1 over only foreground pixels in the second selected pixel block, and setting each average MVD1 as an MVD1 value for the respective MVD1 block. In a fourth example of the method, optionally including one or more or each of the first through third examples, generating each block-level MVD0 comprises: identifying, for each pixel block in a plurality of pixel blocks, a distribution of pixel types in that pixel block, converting each pixel block to a respective MVD0 block based on the distribution of pixel types. In a fifth example of the method, optionally including one or more or each of the first through fourth examples, converting each pixel block to a respective MVD0 block based on the distribution of pixel types comprises: determining that a first selected pixel block has a non-bimodal distribution such that only or predominantly mid-range pixels are present, and in response, calculating an average MVD0 over only mid-range pixels in the first selected pixel block, determining that a second selected pixel block has a bimodal distribution such that the second selected pixel block includes at least one foreground pixel and at least one background pixel, and in response, calculating an average MVD0 over only foreground pixels in the second selected pixel block, and setting each average MVD0 as an MVD0 value for the respective MVD0 block. In a sixth example of the method, optionally including one or more or each of the first through fifth examples, the current frame includes objects with motion vectors and objects without motion vectors, and wherein generating the block-level MVD texture comprises generating the block-level MVD texture based only information relating to the objects with motion vectors. In a seventh example of the method, optionally including one or more or each of the first through sixth examples, outputting the block-level MVD texture for image processing on the first channel and outputting at least the portion of the current frame on the second channel comprises outputting the block-level MVD texture, the objects with motion vectors, and the objects without motion vectors across two or more physically and/or logically separated channels. In an eighth example of the method, optionally including one or more or each of the first through seventh examples, objects without motion vectors comprise particle effects and static user interface elements, and wherein outputting the block-level MVD texture, the objects with motion vectors, and the objects without motion vectors across two or more physically and/or logically separated channels comprises outputting the block-level MVD texture and the objects with motion vectors on the first channel and outputting the objects without motion vectors on the second channel, and wherein the block-level MVD texture is not output on the second channel. In a ninth example of the method, optionally including one or more or each of the first through eighth examples, the current frame includes objects with motion vectors and objects without motion vectors, and wherein generating the block-level MVD texture comprises generating a masked block-level MVD texture, the masked block-level MVD texture generated by masking MVDs associated with objects without motion vectors. In a tenth example of the method, optionally including one or more or each of the first through ninth examples, outputting the block-level MVD texture for image processing on the first channel and outputting at least the portion of the current frame on the second channel comprises outputting the block-level MVD and a duplicate of the current frame on the first channel and outputting the current frame on the second channel.

The disclosure also provides support for a method for sending motion vectors (MVs) to be used in frame rate conversion, comprising: receiving, from a game engine configured to output a current frame of a video game to be rendered on a display device, a pixel-level 1-phase motion vector (MV1) texture comprising, for each pixel, a change in a position of an object at that pixel from the current frame to a previous frame, a pixel-level 0-phase motion vector (MV0) texture comprising, for each pixel, a change in a position of the object at that pixel from the previous frame to the current frame, and a depth texture of one or more objects of the current frame, generating, based on the pixel-level MV1 texture, the pixel-level MV0 texture, and the depth texture, a block-level motion vector with depth (MVD) texture comprising a set of block-level motion vectors each having an associated depth value, and outputting the block-level MVD texture, the one or more objects of the current frame, and additional objects not having motion vectors of the current frame for image processing across two or more physically and/or logically separated channels. In a first example of the method, the additional objects not having motion vectors include particle effects and static user interface elements. In a second example of the method, optionally including the first example, outputting the block-level MVD texture, the one or more objects of the current frame, and additional objects not having motion vectors of the current frame for image processing across two or more physically and/or logically separated channels comprises outputting the block-level MVD texture along with the one or more objects of the current on a first channel and outputting the additional objects on a second channel, and an operating system graphical user interface is blended with the additional objects on the second channel. In a third example of the method, optionally including one or both of the first and second examples, the block-level MVD texture and the one or more objects of the current frame are usable to interpolate a frame between the current frame and the previous frame generated by the game engine. In a fourth example of the method, optionally including one or more or each of the first through third examples, the additional objects not having motion vectors are blended with the interpolated frame.

The disclosure also provides support for a system for motion vectors (MVs) to be used in frame rate conversion, comprising: one or more processors, and memory storing instructions executable by the one or more processors to: receive, from a game engine configured to output a current frame of a video game to be rendered on a display device, a pixel-level 1-phase motion vector (MV1) texture comprising, for each pixel, a change in a position of an object at that pixel from the current frame to a previous frame, a pixel-level 0-phase motion vector (MV0) texture comprising, for each pixel, a change in a position of the object at that pixel from the previous frame to the current frame, and a depth texture of one or more objects of the current frame, generate, a block-level motion vector with depth (MVD) texture comprising a set of block-level motion vectors each having an associated depth value based on the pixel-level MV1 texture, the pixel-level MV0 texture, and the depth texture, and output the block-level MVD texture, the one or more objects of the current frame, and output additional objects not having motion vectors of the current frame for image processing across two or more physically and/or logically separated channels. In a first example of the system, the block-level MVD texture and the one or more objects of the current frame are output on a first channel and the additional objects are output on a second channel. In a second example of the system, optionally including the first example, one or more objects of the current frame and the additional objects are output on a first physical channel and the block-level MVD texture is output on a second physical channel. In a third example of the system, optionally including one or both of the first and second examples, the block-level MVD texture, the one or more objects of the current frame, and the additional objects not having motion vectors of the current frame are output to an image processing module configured to interpolate a frame between the current frame and a previous frame generated by the game engine using the block-level MVD texture.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
generating, based on a current frame to be rendered, a block-level motion vector with depth (MVD) texture that comprises a set of block-level motion vectors each having an associated depth value; and
outputting the block-level MVD texture for image processing on a first channel and outputting at least a portion of the current frame on a second channel, wherein the set of block-level motion vectors includes a first set of block-level 0-phase motion vectors with depth (MVD0s) and a second set of block-level 1-phase motion vectors with depth (MVD1s), each block-level MVD0 and MVD1 having an associated depth value, wherein each block-level MVD1 is generated from a respective group of pixel-level MVD1s, each pixel-level MVD1 representing a change in a position of an object at that pixel from the current frame to a previous frame, and wherein each block-level MVD0 is generated from a respective group of pixel-level MVD0s, each pixel-level MVD0 representing a change in a position of the object at that pixel from the previous frame to the current frame.

2. The method of claim 1, wherein generating each block-level MVD1 comprises:
identifying, for each pixel block in a plurality of pixel blocks, a distribution of pixel types in that pixel block; and
converting each pixel block to a respective MVD1 block based on the distribution of pixel types.

3. The method of claim 2, wherein converting each pixel block to a respective MVD1 block based on the distribution of pixel types comprises:
determining that a first selected pixel block has a non-bimodal distribution such that only or predominantly mid-range pixels are present, and in response, calculating an average MVD1 over only mid-range pixels in the first selected pixel block;
determining that a second selected pixel block has a bimodal distribution such that the second selected pixel block includes at least one foreground pixel and at least one background pixel, and in response, calculating an average MVD1 over only foreground pixels in the second selected pixel block; and
setting each average MVD1 as an MVD1 value for the respective MVD1 block.

4. The method of claim 1, wherein generating each block-level MVD0 comprises:
identifying, for each pixel block in a plurality of pixel blocks, a distribution of pixel types in that pixel block; and
converting each pixel block to a respective MVD0 block based on the distribution of pixel types.

5. The method of claim 4, wherein converting each pixel block to a respective MVD0 block based on the distribution of pixel types comprises:
determining that a first selected pixel block has a non-bimodal distribution such that only or predominantly mid-range pixels are present, and in response, calculating an average MVD0 over only mid-range pixels in the first selected pixel block;
determining that a second selected pixel block has a bimodal distribution such that the second selected pixel block includes at least one foreground pixel and at least one background pixel, and in response, calculating an average MVD0 over only foreground pixels in the second selected pixel block; and
setting each average MVD0 as an MVD0 value for the respective MVD0 block.

6. The method of claim 1, wherein the current frame includes objects with motion vectors and objects without motion vectors, and wherein generating the block-level MVD texture comprises generating the block-level MVD texture based only information relating to the objects with motion vectors.

7. The method of claim 6, wherein outputting the block-level MVD texture for image processing on the first channel and outputting at least the portion of the current frame on the second channel comprises outputting the block-level MVD texture, the objects with motion vectors, and the objects without motion vectors across two or more physically and/or logically separated channels.

8. The method of claim 7, wherein objects without motion vectors comprise particle effects and static user interface elements, wherein outputting the block-level MVD texture, the objects with motion vectors, and the objects without motion vectors across two or more physically and/or logically separated channels comprises outputting the block-level MVD texture and the objects with motion vectors on the first channel and outputting the objects without motion vectors on the second channel, and wherein the block-level MVD texture is not output on the second channel.

9. The method of claim 1, wherein the current frame includes objects with motion vectors and objects without motion vectors, and wherein generating the block-level MVD texture comprises generating a masked block-level MVD texture, the masked block-level MVD texture generated by masking MVDs associated with objects without motion vectors.

10. The method of claim 9, wherein outputting the block-level MVD texture for image processing on the first channel and outputting at least the portion of the current frame on the second channel comprises outputting the block-level MVD and a duplicate of the current frame on the first channel and outputting the current frame on the second channel.

11. A method for sending motion vectors (MVs) to be used in frame rate conversion, comprising:
receiving, from a game engine configured to output a current frame of a video game to be rendered on a display device, a pixel-level 1-phase motion vector (MV1) texture comprising, for each pixel, a change in a position of an object at that pixel from the current frame to a previous frame, a pixel-level 0-phase motion vector (MV0) texture comprising, for each pixel, a change in a position of the object at that pixel from the previous frame to the current frame, and a depth texture of one or more objects of the current frame;

generating, based on the pixel-level MV1 texture, the pixel-level MV0 texture, and the depth texture, a block-level motion vector with depth (MVD) texture comprising a set of block-level motion vectors each having an associated depth value; and outputting the block-level MVD texture, the one or more objects of the current frame, and additional objects not having motion vectors of the current frame for image processing across two or more physically and/or logically separated channels, including outputting the block-level MVD texture along with the one or more objects of the current frame on a first channel and outputting the additional objects on a second channel.

12. The method of claim 11, wherein the additional objects not having motion vectors include particle effects and static user interface elements.

13. The method of claim 11, wherein an operating system graphical user interface is blended with the additional objects on the second channel.

14. The method of claim 11, wherein the block-level MVD texture and the one or more objects of the current frame are usable to interpolate a frame between the current frame and the previous frame generated by the game engine.

15. The method of claim 14, wherein the additional objects not having motion vectors are blended with the interpolated frame.

16. A system for motion vectors (MVs) to be used in frame rate conversion, comprising:
   one or more processors; and
   memory storing instructions executable by the one or more processors to:
   receive, from a game engine configured to output a current frame of a video game to be rendered on a display device, a pixel-level 1-phase motion vector (MV1) texture comprising, for each pixel, a change in a position of an object at that pixel from the current frame to a previous frame, a pixel-level 0-phase motion vector (MV0) texture comprising, for each pixel, a change in a position of the object at that pixel from the previous frame to the current frame, and a depth texture of one or more objects of the current frame;
   generate, a block-level motion vector with depth (MVD) texture comprising a set of block-level motion vectors each having an associated depth value based on the pixel-level MV1 texture, the pixel-level MV0 texture, and the depth texture; and
   output the block-level MVD texture, the one or more objects of the current frame, and additional objects not having motion vectors of the current frame for image processing across two or more physically and/or logically separated channels, including outputting the one or more objects of the current frame and the additional objects on a first physical channel and outputting the block-level MVD texture on a second physical channel.

17. The system of claim 16, wherein the block-level MVD texture, the one or more objects of the current frame, and the additional objects not having motion vectors of the current frame are output to an image processing module configured to interpolate a frame between the current frame and a previous frame generated by the game engine using the block-level MVD texture.

* * * * *